(12) United States Patent
Liu et al.

(10) Patent No.: US 11,600,973 B2
(45) Date of Patent: Mar. 7, 2023

(54) CABLE CLAMP AND CABLE CLAMPING ASSEMBLY AND CABLE CLAMPING METHOD THEREOF

(71) Applicant: Delta Electronics, Inc., Taoyuan (TW)

(72) Inventors: Chia-Yang Liu, Taoyuan (TW); Hung-Sheng Hsieh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/357,988

(22) Filed: Jun. 25, 2021

(65) Prior Publication Data

US 2022/0140583 A1 May 5, 2022

(30) Foreign Application Priority Data

Nov. 2, 2020 (CN) .......................... 202011205430.9

(51) Int. Cl.
*H02G 3/04* (2006.01)
*F16B 9/02* (2006.01)

(52) U.S. Cl.
CPC .................... *H02G 3/04* (2013.01); *F16B 9/02* (2013.01)

(58) Field of Classification Search
CPC .................................... H02G 3/04; F16B 9/02
USPC ........................................................ 174/135
See application file for complete search history.

(56) References Cited

U.S. PATENT DOCUMENTS

| | | | |
|---|---|---|---|
| 3,632,071 A * | 1/1972 | Cameron | F16L 3/10 248/205.3 |
| 4,128,918 A * | 12/1978 | Wenk | F16L 33/035 24/543 |
| 4,372,011 A * | 2/1983 | Aranyos | F16L 33/035 24/16 PB |
| 4,609,171 A | 9/1986 | Matsui | |
| 4,870,722 A * | 10/1989 | Shell, Jr. | H02G 3/26 248/69 |

(Continued)

FOREIGN PATENT DOCUMENTS

| | | |
|---|---|---|
| EP | 2730827 A1 | 5/2014 |
| TW | 286347 B | 9/1996 |

(Continued)

*Primary Examiner* — Timothy J Thompson
*Assistant Examiner* — Michael F McAllister
(74) *Attorney, Agent, or Firm* — Kirton McConkie; Evan R. Witt

(57) ABSTRACT

A cable clamping assembly includes a cable clamp and a supporting base. The cable clamp includes a protruding base and two bendable arms. The protruding base has an opening disposed on the center of a top surface. The two bendable arms respectively include a plurality of first latching components and a plurality of second latching components. The supporting base includes a concave portion. A guiding slope and a positioning portion are disposed within the concave portion. When the cable clamp clamps a cable, the two bendable arms respectively slide downwardly along two ends of the guiding slope to surround the cable, until one of the two bendable arms is stopped by the positioning portion. The protruding base is deformed in response to a pressing force, so that the bendable arms tie the cable closely, and the plurality of first latching components lock with the plurality of second latching components.

10 Claims, 6 Drawing Sheets

(56) References Cited

U.S. PATENT DOCUMENTS

| | | | | |
|---|---|---|---|---|
| 5,148,576 A | * | 9/1992 | Dyer | F16L 33/035 24/20 R |
| 5,423,501 A | * | 6/1995 | Yu | F16L 3/233 248/62 |
| 6,398,170 B1 | | 6/2002 | Wada | |
| 8,020,810 B2 | | 9/2011 | Dietrich et al. | |
| 9,663,007 B2 | | 5/2017 | Murasaki et al. | |
| 2006/0130285 A1 | * | 6/2006 | Lares | F16L 33/035 24/16 PB |
| 2009/0235493 A1 | * | 9/2009 | Bolduan | D06F 39/08 24/19 |
| 2010/0096511 A1 | * | 4/2010 | Olver | H02G 3/32 248/65 |
| 2011/0163533 A1 | * | 7/2011 | Snyder | F16L 33/035 285/88 |
| 2014/0131528 A1 | * | 5/2014 | Blakeley | H02G 3/32 248/74.2 |
| 2015/0114683 A1 | * | 4/2015 | O'Regan | H01B 3/30 174/174 |
| 2018/0252336 A1 | * | 9/2018 | Erkelens | B64C 1/406 |
| 2019/0036314 A1 | * | 1/2019 | Toll | H02G 3/0456 |

FOREIGN PATENT DOCUMENTS

| | | |
|---|---|---|
| TW | 103169 U | 8/2000 |
| TW | M379001 U | 4/2010 |
| TW | M406307 U | 6/2011 |

\* cited by examiner

CABLE CLAMP AND CABLE CLAMPING ASSEMBLY AND CABLE CLAMPING METHOD THEREOF

CROSS-REFERENCE TO RELATED APPLICATION

This application claims priority to China Patent Application No. 202011205430.9, filed on Nov. 2, 2020. The entire contents of the above-mentioned applications are incorporated herein by reference for all purposes.

FIELD OF THE INVENTION

The present disclosure relates to a cable clamping assembly, and more particularly to a cable clamping assembly having an open cable clamp to clamp cables fast and convenient.

BACKGROUND OF THE INVENTION

With the rapid development of technology, there are various electronic products developed day by day, these electronic products occupy most of people's daily life. However, in these electronic products, they have a variety of components. For transmitting signals or currents between the various components, cables must be used. In order to miniaturize the electronic products, the cable routing management is a key point. If the cable routing in the electronic product is messy, it will occupy too much space, which will compress the installation space of the components, and is not conducive to the miniaturization of the electronics products.

Generally, in order to properly manage the internal cable routing of the electronic products, clips are usually used to manage the internal cables. In the prior art, a closed metal collar is usually used as the clips to manage cable. The cable managing process is first to sleeve the metal collar on the cables to be managed, and then the ends of the cables are coupled or welded to the corresponding electronic component. While, the assembly process needs to sleeve the metal collar on the cables by manual assembly. Moreover, in order to clamp the cable firmly, it is necessary to clamp the closed metal collar by using some tool, and it is also done by manual assembly, so that the cable can be firmly clamp and properly managed. Therefore, it is time-consuming and inconvenient assembly. In the meantime, due to the metal collar is a closed structure, when it assembled to the cables, one end of the cables needs to be a free end, thereby the metal collar can sleeve on the cables through the free end, so as to clamp the cables. After the sleeve process is finished, the free end of the cables can be coupled or welded with the desired electronic component. Under this circumstance, the assembling process of the internal electronic component of the electronic product would be limited to the sleeve and clamping procedures, and cannot be assembled quickly and efficiently. In fact, the prior are lacks the flexibility of the assembly process, and the applicability is limited accordingly.

Therefore, there is a need of providing a cable clamp and a cable clamping assembly and a cable clamping method thereof to obviate the drawbacks encountered from the prior arts.

SUMMARY OF THE INVENTION

It is an object of the present disclosure to provide a cable clamp. The cable clamp includes a protruding base and two bendable arms. The two bendable arms surround a cable. The protruding base is deformed in response to a pressing force. Consequently, the cable is tied by the bendable arms firmly, and the plurality of first latching components lock with the plurality of second latching components. Consequently, the tightness of clamping cable by cable clamp the can be adjustable, and the assembling process is more precisely and reliable.

It is another object of the present disclosure to provide a cable clamping assembly and a cable clamping method thereof. The cable clamping assembly includes a cable clamp and a supporting base. A cable is disposed in a concave portion of the supporting base. The two bendable arms respectively slide downwardly along two ends of a guiding slope of the concave portion to surround the cable, until one of the two bendable arms is stopped by the positioning portion. The protruding base is deformed in response to a pressing force, so that the bendable arms tie the cable closely, and the plurality of first latching components lock with the plurality of second latching components. Consequently, the disadvantages of time-consuming, inconvenient assembly, low producing efficiency and lacking applicable of the prior art can be avoided.

In accordance with an aspect of the present disclosure, there is provided cable clamp including a protruding base and two bendable arms. The protruding base has a top surface, wherein an opening is disposed on the center of the top surface, so as to enhance the structure strength. The two bendable arms respectively include a plurality of first latching components and a plurality of second latching components. The two bendable arms surround a cable. The protruding base is deformed in response to a pressing force, so that the bendable arms tie the cable closely, and the plurality of first latching components lock with the plurality of second latching components.

In an embodiment, the cable clamp is made of a flexible material.

In an embodiment, the two bendable arms are respectively connected to the two corresponding side of the protruding base.

In an embodiment, the plurality of first latching components are a plurality of protruding portions, and the plurality of second latching components are a plurality of holes, when the plurality of first latching components are latched to the plurality of second latching components, at least one of the plurality of protruding portions are respectively locked in at least one of the plurality of holes.

In accordance with another aspect of the present disclosure, there is provided a cable clamping assembly. The cable clamping assembly comprises a cable clamp and a supporting base. The cable clamp includes a protruding base and two bendable arms. The two bendable arms respectively include a plurality of first latching components and a plurality of second latching components. The supporting base includes a concave portion. A guiding slope and a positioning portion are disposed within the concave portion. When the cable clamp clamps a cable, the two bendable arms respectively slide downwardly along two ends of the guiding slope to surround the cable, until one of the two bendable arms is stopped by the positioning portion. The protruding base is deformed in response to a pressing force, so that the bendable arms tie the cable closely, and the plurality of first latching components lock with the plurality of second latching components.

In an embodiment, the concave portion of the supporting base is a semicircular concave portion.

In an embodiment, the concave portion includes a first surface, a second surface and a third surface, the third surface connects with the first surface and the second surface, and there is a height difference between the first surface and the second surface.

In an embodiment, the guiding slope of the concave portion is defined by the second surface and the third surface.

In an embodiment, the positioning portion is formed on the second surface, and is formed by bending the second surface.

In accordance with another aspect of the present disclosure, there is provided a cable clamping method. First, a cable clamp and a supporting base are provided. The cable clamp includes a protruding base and two bendable arms. The two bendable arms respectively include a plurality of first latching components and a plurality of second latching components. The supporting base including a concave portion. Then, a cable is provided, and the cable is disposed in the concave portion of the supporting base. After that, the two bendable arms respectively slide downwardly along two ends of a guiding slope of the concave portion to surround the cable, until one of the two bendable arms being stopped by the positioning portion. Finally, the protruding base is deformed in response to a pressing force, so that the bendable arms tie the cable firmly, and the plurality of first latching components lock with the plurality of second latching components.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
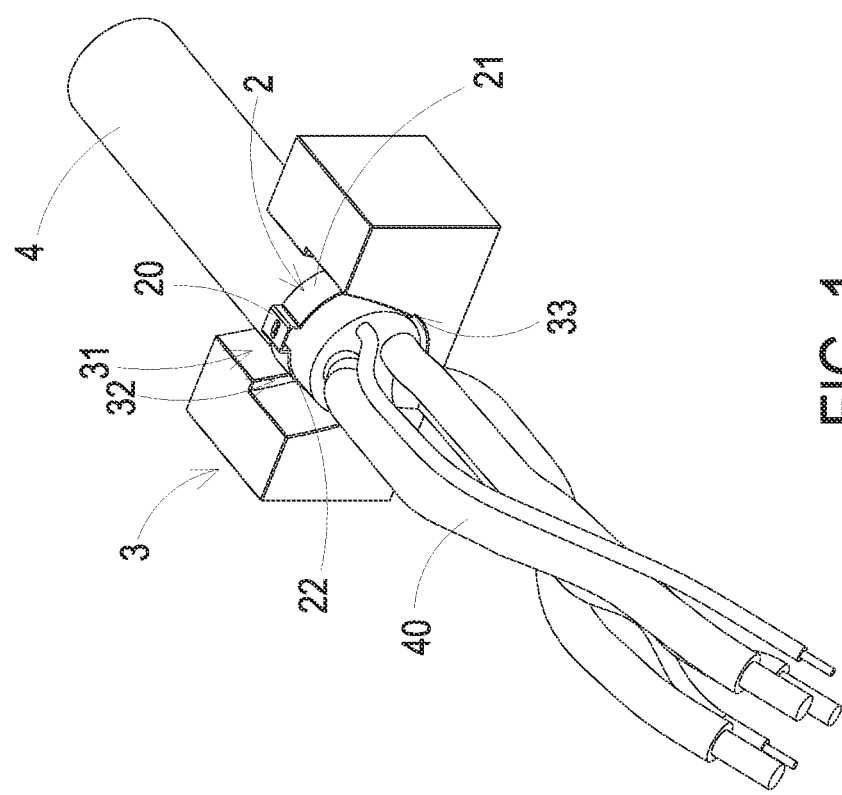
FIG. 1 is a schematic perspective view illustrating a cable clamping assembly clamping a cable according to an embodiment of the present disclosure.
Figure 3:
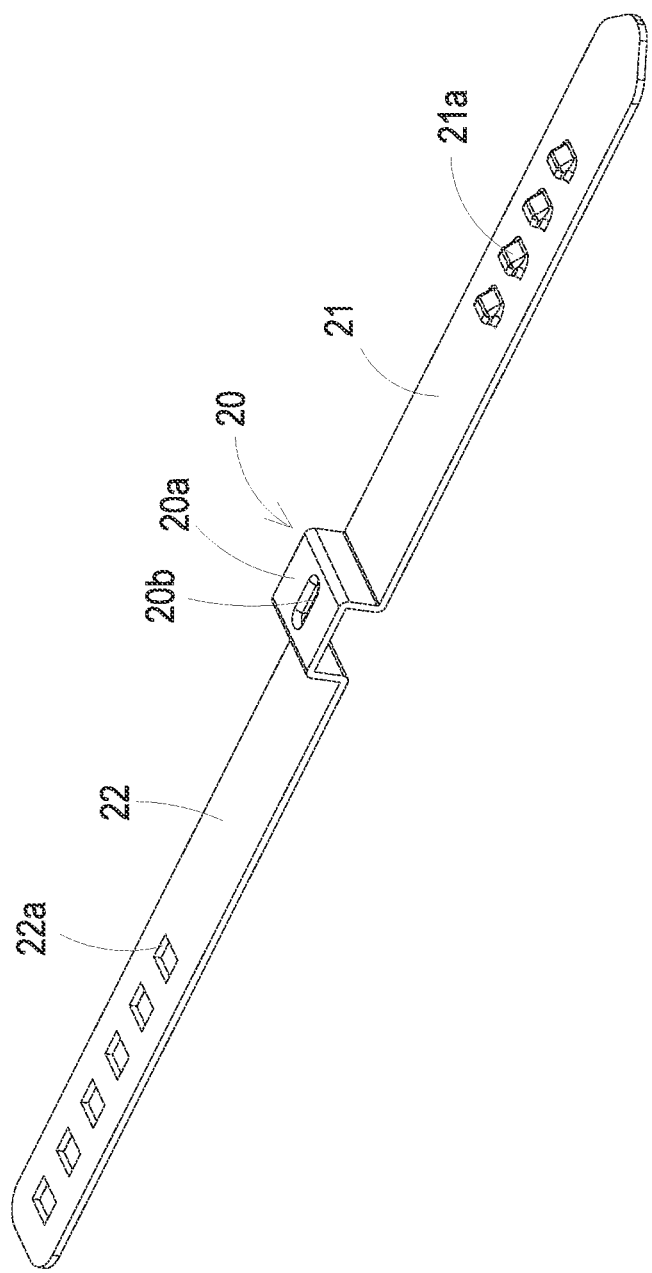
FIG. 3 is a schematic perspective view illustrating the open state of a cable clamp of the cable clamping assembly according to the embodiment of the present disclosure.

FIG. 1 is a schematic perspective view illustrating a cable clamping assembly clamping a cable according to an embodiment of the present disclosure. As shown in FIG. 1, the cable clamping assembly 1 includes a cable clamp 2 and a supporting base 3. The cable clamp 2 includes a protruding base 20 and two bendable arms 21 and 22. The two bendable arms 21 and 22 respectively include a plurality of first latching components 21a and a plurality of second latching components 22a (as shown in FIG. 3), but not limited thereto. The supporting base 3 includes a concave portion 31. A guiding slope 32 and a positioning portion 33 are disposed within the concave portion 31. At least a cable 4 is placed in the concave portion 31 of the supporting base 3. The cable clamp 2 is downward disposed and in correspondence to the concave portion 31 of the supporting base 3. The two bendable arms 21 and 22 respectively slide downwardly along two ends 32a and 32b of the guiding slope 32 to surround the cable 4, until one of the two bendable arms 21 and 22 is stopped by the positioning portion 33. The protruding base 20 is deformed in response to a pressing force, so that the two bendable arms 21 and 22 are near to each other, and the plurality of first latching components 21a lock with the plurality of second latching components 22a. Consequently, the cable 4 is clamped and firmly fixed by the cable clamp 2.

Figure 2:
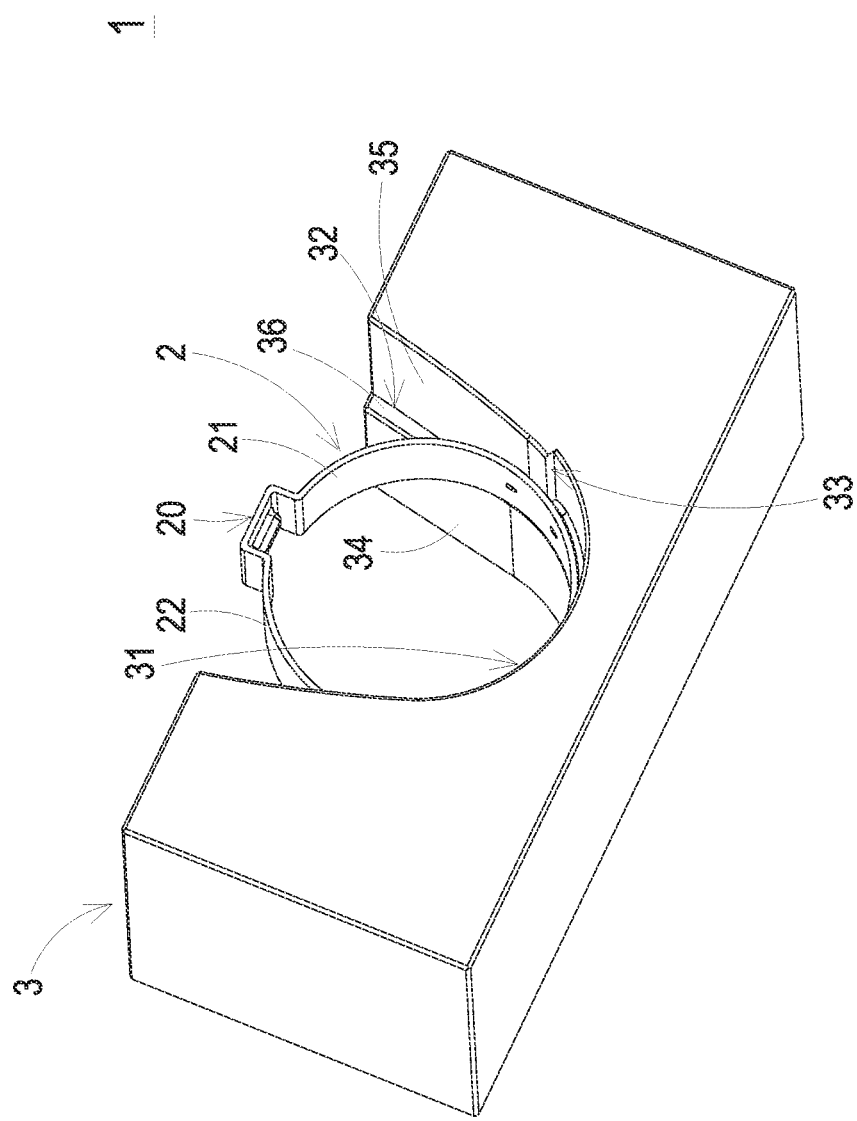
FIG. 2 is a schematic perspective view illustrating the cable clamping assembly according to the embodiment of the present disclosure.
Figure 4:
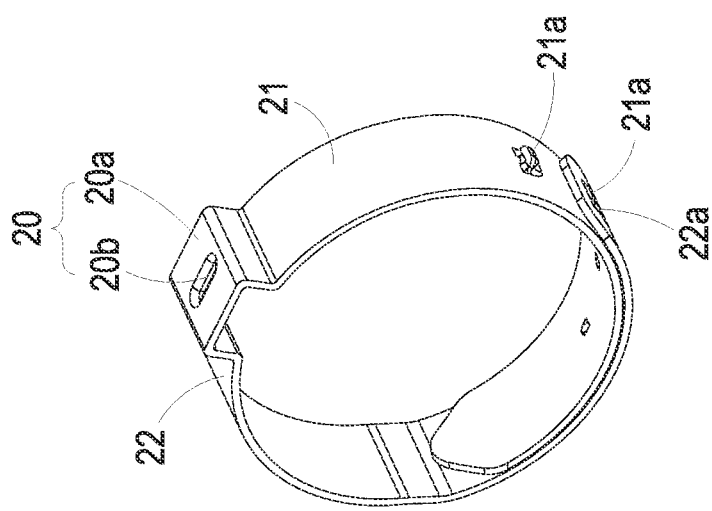
FIG. 4 is a schematic perspective view illustrating the cable clamp according to the embodiment of the present disclosure.

FIG. 2 is a schematic perspective view illustrating the cable clamping assembly according to the embodiment of the present disclosure. FIG. 3 is a schematic perspective view illustrating the open state of a cable clamp of the cable clamping assembly according to the embodiment of the present disclosure. FIG. 4 is a schematic perspective view illustrating the cable clamp according to the embodiment of the present disclosure. For clearly to illustrate the structures and the related arrangement between the cable clamp 2 and the supporting base 3 of the cable clamping assembly 1, cable 4 is hereby ignored in FIG. 4. In the embodiment, the cable clamp 2 is an open cable clamp, which means the two bendable arms 21 and 22 are not touched with each other at the initial state. In some embodiments, the cable clamp 2 is made of a flexible material, but not limited thereto. For example, the flexible material may be metal or flexible rubber, etc. Due to the flexible property, the two arms 21 and 22 are bendable, so that they can be latched with each other. Please refer to FIG. 3, for easily to see the structure of the cable clamp 2, the two arms 21 and 22 are illustrated as an opened flat state, while they are bended during the utilized state. Please refer to FIGS. 1 to 4. In the embodiment, the two arms 21 and 22 of the cable clamp 2 is a first arm 21 and a second arm 22, wherein the first arm 21 and the second arm 22 are respectively connected to the two corresponding side of the protruding base 20. In some embodiments, the protruding base 20, the first arm 21 and the second arm 22 are an integrated structure, but not limited thereto. The protruding base 20 is a protruding stage structure and includes a top surface 20a. The top surface 20a has a height difference to the first arm 21 and the second arm 22. In this embodiment, there is an opening 20b disposed on the center of the top surface 20a, so as to enhance the structure strength. When a pressing force is applied on the two sides of the protruding base 20, the pressing force is delivered to the center of the top surface 20a, and then eliminate by the opening 20b on the central portion. Consequently, top surface 20a of the protruding base 20 can remain the structure stability under the pressing force.

Please refer to FIG. 3. The first arm 21 and the second arm 22 of the cable clamp 2 respectively include a plurality of first latching components 21a and a plurality of second latching components 22a. In this embodiment, the plurality of first latching components 21a can be but not limited to be a plurality of protruding portions. The plurality of second latching components 22a can be but not limited to be a plurality of holes. When the plurality of first latching components 21a are latched to the plurality of second latching components 22a, at least one of the plurality of protruding portions are respectively locked in at least one of the plurality of holes. While, in some embodiments, the types of the first latching components 21a and the second latching components 22a may be varied. For example, the first latching components 21a and the second latching components 22a may be hooking structures, magnetic structures or other tight fitting manners corresponding with each other, but not limited thereto. In other words, the purpose of the first latching components 21a and the second latching components 22a are coupling and fixing with each other, and the types of which may be varied according to the practical requirements. As shown in FIG. 4, the plurality of protruding portions of the first latching components 21a are respectively locked in the plurality of holes of the second latching components 22a, so that the first arm 21 and the second arm 22 of the cable clamp 2 are firmly fixed with each other. Consequently, the cable 4 is tightly fixed by the cable clamp 2 as shown in FIG. 1.

Figure 5:
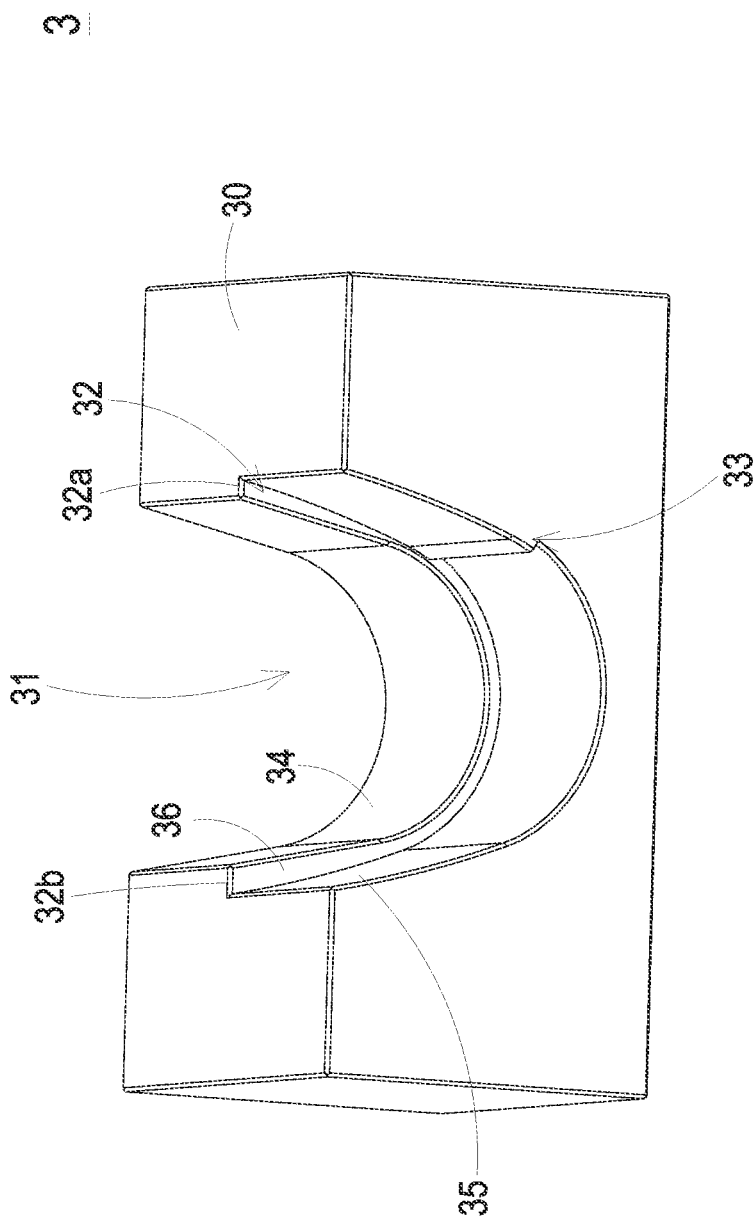
FIG. 5 is a schematic perspective view illustrating a supporting base of the cable clamping assembly according to the embodiment of the present disclosure.

FIG. 5 is a schematic perspective view illustrating a supporting base of the cable clamping assembly according to the embodiment of the present disclosure. Please refer to FIGS. 1, 2 and 5. As shown in the FIGS, the supporting base 3 can be but not limited to be a cube structure and includes an upper surface 30. In the embodiment, the concave portion 31 is formed by a portion of the upper surface 30 recessed inwardly. In some embodiments, the concave portion 31 of the supporting base 3 is a semicircular concave portion, but not limited thereto. The types of the concave portion 31 and the supporting base 3 are not limited to the above embodiments, and can be adjustable according the practical requirement.

Please refer to FIG. 5 again. The concave portion 31 includes a first surface 34, a second surface 35 and a third surface 36. The third surface 36 connects with the first surface 34 and the second surface 35, and there is a height difference between the first surface 34 and the second surface 35. In this embodiment, the concave portion 31 is a semicircular concave portion, and the inner surface of the concave portion 31 are composed of the first surface 34 and the second surface 35, and the third surface 36 vertically connects between the first surface 34 and the second surface 35, so as to form the height difference between the first surface 34 and the second surface 35. In other words, the first surface 34 and the second surface 35 are not coplanar, and the height difference between the first surface 34 and the second surface 35 is defined by the third surface 36.

As shown in FIG. 5, the guiding slope 32 of the concave portion 31 is defined by the second surface 35 and the third surface 36. The guiding slope 32 has two ends, which are the first end 32a and the second end 32b. In some embodiments, the positioning portion 33 is formed on the second surface 35, and is formed by bending the second surface 35. In this embodiment, the positioning portion 33 is a step structure formed by bending the second surface 35, but not limited thereto. Please refer to FIG. 2 again, the first arm 21 and the second arm 22 slide downwardly from the first end 32a and the second end 32b, and then slide downwardly along the guiding slope 32, until one of the first arm 21 and the second arm 22 is stopped by the positioning portion 33. In this embodiment, the second arm 22 is stopped by the positioning portion 33, so as to limit the movement of the second arm 22. Since the second arm 22 is stopped by the positioning portion 33, when the pressing force keeps on delivered to the first arm 21, the first arm 21 can be pressed closely, so as to adjust the latching positions of the corresponding first latching components 21a and the second latching components 21a. Consequently, the tightness of the cable clamp 2 clamping the cable 4 can be adjustable. In other embodiments, the positioning portion 33 can be but not limited to be a protruding rib or other stopped structure, which is not limited to the above embodiments, and can be adjustable according the practical requirement.

Figure 6:
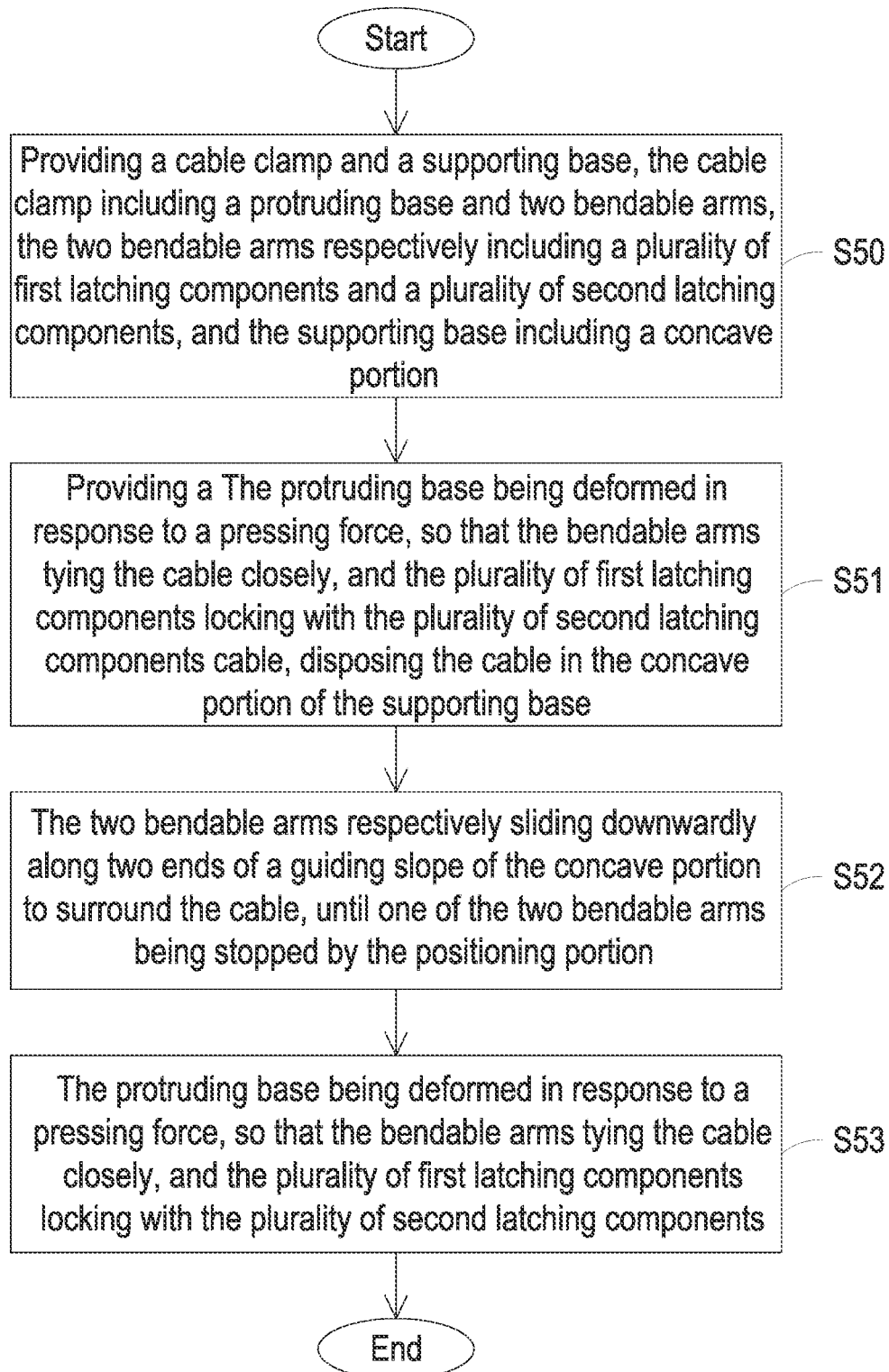
FIG. 6 is a flowchart illustrating a cable clamping method according to an embodiment of the present disclosure.

FIG. 6 is a flowchart illustrating a cable clamping method according to an embodiment of the present disclosure. Please refer to FIGS. 1 to 6. As shown in FIG. 1, the cable clamp 2 is for holding and fixing the cable 4. In some embodiments, the cable 4 may be but not limited to be a cable bundle composed of a plurality of cables 40. In other embodiments, the cable 4 may be a single cable 4, the number of the cable 4 may be changed according to the practical requirements. Please refer to FIG. 6, which is the cable clamping method for the cable clamp 2 clamping the cable 4. First, in a step S50, a cable clamp 2 and a supporting base 3 as shown in FIGS. 1 and 2 are provided, wherein the cable clamp 2 includes a protruding base 20 and two bendable arms 21 and 22. The two bendable arms 21 and 22 respectively include a plurality of first latching components 21a and a plurality of second latching components 22a. The supporting base 3 included a concave portion 31. Then, in a step S51, a cable 4 is provided, and the cable 4 is correspondingly disposed in the concave portion 31 of the supporting base 3. After that, in a step S52, the cable clamp 2 is disposed downwardly in correspondence to the concave portion 31 of the supporting base 3, so that the first arm 21 and the second arm 22 of the cable clamp 2 respectively slide downwardly along the first end 32a and the second end 32b of the guiding slope 32 of the concave portion 31, and the first arm 21 and the second arm 22 are near and covered with each other. Consequently, the cable 4 disposed in the concave portion 31 is surrounded by the first arm 21 and the second arm 22. The first arm 21 and the second arm 22 keep on sliding along the guiding slope 32 until the front end of the second arm 22 is stopped by the positioning portion 33. Since the second arm 22 is stopped by the positioning portion 33, the second arm 22 cannot move forward.

In a step S53, a pressing force is applied on the two sides of the protruding base 20 of the cable clamp 2, due to the continuously pressing, the protruding base 20 is deformed, and the deformation force is delivered downwardly to the first arm 21 and the second arm 22. The first arm 21 and the second arm 22 move near to each other in response to the deformation force, so that the cable 4 is tightly clamped by the first arm 21 and the second arm. In the same time, the plurality of protruding portions of the first latching components 21a are respectively locked in the plurality of holes of second latching components 22a. Consequently, by providing a pressing force on the protruding base 20, the cable 4 can be clamped tightly and firmly by the cable clamp 2. Moreover, the tightness of the cable clamp 2 clamping the cable 4 can be adjustable by the latching position between the first latching components 21a and the second latching components 22a. Consequently, the tightness of the cable clamp 2 clamping the cable 4 can be micro-adjustable by moving the first arm 21 and the second arm 22 to adjust the latching position of the corresponding first latching components 21a and the second latching components 22a.

In some embodiments, the cable clamping method can be but not limited to be an automatic cable clamping process. More specifically, the cable 4 can be placed in the concave portion 31 of the supporting base 3 by a robotic arm, and the cable clamp can also be disposed downwardly in correspondence to the concave portion 31 by the robotic arm. Similar, the pressing force applied on the two sides of the protruding base 20 of the cable clamp 2 can also be provided by the robotic arm or an automatic clamp, so as to adjust the pressing force by a designed program. That is, the tightness of the cable clamp 2 clamping the cable 4 can be precisely adjusted. The procedures and the mechanism of the automatic cable clamping process are not limited to the above embodiments, which can be adjustable according the practical requirement. Consequently, the automatic cable clamping process and the cable clamping assembly 1 of the present disclosure is benefit in saving time-cost of the assembling process and enhancing the efficiency and stability of production. Hence, the assembly process of the present disclosure is convenient, highly flexibility and widely applicable. For example, whether the two ends of the cable 4 are coupled with other electronic elements, the cable clamping assembly 1 of the present disclosure can easily clamp and fix the cable 4, so as to properly manage the cable 4.

From the above descriptions, the present disclosure provides a cable clamp and a cable clamping assembly and a cable clamping method thereof. The cable clamping assembly includes a cable clamp and a supporting base, by disposing a cable in a concave portion of the supporting base, and then the two bendable arms respectively slide downwardly along a guiding slope to surround the cable. The protruding base of the cable clamp is deformed in response to a pressing force, so that the bendable arms tie the cable closely, and the plurality of first latching components lock with the plurality of second latching components. Consequently, the tightness of the cable clamp clamping the cable can be micro-adjustable, and the assembling process is more precisely and reliable. Namely, the cable clamp and the cable clamping assembly of the present disclosure with the cooperation of the automatic cable clamping process can be efficacy in fast clamping cable, saving time-cost of the assembling process and enhancing the efficiency and stability of production. Hence, the assembly process of the present disclosure is convenient, highly flexibility and widely applicable.

While the disclosure has been described in terms of what is presently considered to be the most practical and preferred embodiments, it is to be understood that the disclosure needs not be limited to the disclosed embodiment.

What is claimed is:

1. A cable clamp, comprising:
   a protruding base having a top surface, wherein the protruding base is a protruding stage, and an opening is disposed on the center of the top surface to enhance the structure strength; and
   two bendable arms respectively including a plurality of first latching components and a plurality of second latching components;
   wherein the two bendable arms surround a cable, and the protruding base is deformed in response to a pressing force, so that the two bendable arms tie the cable closely, and the plurality of first latching components lock with the plurality of second latching components.

2. The cable clamp according to claim 1, wherein the cable clamp is made of a flexible material.

3. The cable clamp according to claim 1, wherein the two bendable arms are respectively connected to the two corresponding side of the protruding base.

4. The cable clamp according to claim 1, wherein the plurality of first latching components are a plurality of protruding portions, and the plurality of second latching components are a plurality of holes, when the plurality of first latching components are latched to the plurality of second latching components, at least one of the plurality of protruding portions are respectively locked in at least one of the plurality of holes.

5. A cable clamping assembly, comprising:
   a cable clamp including a protruding base and two bendable arms, the two bendable arms respectively including a plurality of first latching components and a plurality of second latching components; and
   a supporting base including a concave portion, wherein a guiding slope and a positioning portion are disposed within the concave portion;
   wherein when the cable clamp clamps a cable, the two bendable arms respectively slide downwardly along two ends of the guiding slope to surround the cable, until one of the two bendable arms is stopped by the positioning portion, and the protruding base is deformed in response to a pressing force, so that the bendable arms tie the cable closely, and the plurality of first latching components lock with the plurality of second latching components.

6. The cable clamping assembly according to claim 5, wherein the concave portion of the supporting base is a semicircular concave portion.

7. The cable clamping assembly according to claim 5, wherein the concave portion includes a first surface, a second surface and a third surface, and the third surface connects with the first surface and the second surface, and there is a height difference between the first surface and the second surface.

8. The cable clamping assembly according to claim 7, wherein the guiding slope of the concave portion is defined by the second surface and the third surface.

9. The cable clamping assembly according to claim 7, wherein the positioning portion is formed on the second surface, and is formed by bending the second surface.

10. A cable clamping method, comprising steps of:
   (a) providing a cable clamp and a supporting base, the cable clamp including a protruding base and two bendable arms, the two bendable arms respectively including a plurality of first latching components and a plurality of second latching components, and the supporting base including a concave portion;
   (b) providing a cable and disposing the cable in the concave portion of the supporting base;
   (c) the two bendable arms respectively sliding downwardly along two ends of a guiding slope of the concave portion to surround the cable, until one of the two bendable arms being stopped by a positioning portion; and
   (d) the protruding base being deformed in response to a pressing force, so that the bendable arms tying the cable closely, and the plurality of first latching components locking with the plurality of second latching components.

* * * * *